US006678686B1

(12) United States Patent
Patel et al.

(10) Patent No.: US 6,678,686 B1
(45) Date of Patent: Jan. 13, 2004

(54) METHOD AND APPARATUS FOR EVALUATING INDEX PREDICATES ON COMPLEX DATA TYPES USING VIRTUAL INDEXED STREAMS

(75) Inventors: Jignesh M. Patel, Ann Arbor, MI (US); Navin Kabra, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/474,040

(22) Filed: Dec. 28, 1999

(51) Int. Cl.[7] .............................. G06F 7/00; G06F 15/00
(52) U.S. Cl. ........................................ 707/100; 715/513
(58) Field of Search ....................... 707/1–10, 100–200, 707/205; 709/219, 203, 236; 717/110–117; 715/513, 530, 522–523

(56) References Cited

U.S. PATENT DOCUMENTS

| 5,548,770 A | * | 8/1996 | Bridges .......................... 707/2 |
| 5,682,535 A | * | 10/1997 | Knudsen ....................... 717/117 |
| 6,338,056 B1 | * | 1/2002 | Dessloch et al. .............. 707/2 |
| 6,341,281 B1 | * | 1/2002 | MacNicol et al. ............. 707/3 |

OTHER PUBLICATIONS

Microsoft Computer Dictionary, Fifth Edition, p. 532.*

* cited by examiner

*Primary Examiner*—Uyen Le
*Assistant Examiner*—T. Y Chen
(74) *Attorney, Agent, or Firm*—Gates & Cooper

(57) ABSTRACT

A method, apparatus, article of manufacture, and a memory structure for providing access to abstract data types using an index providing a tuple. The method comprises the steps of accepting a database query; generating an index predicate from the database query; and determining a tuple from an index using the index predicate. The tuple is associated with an abstract or complex data type responsive to the database query. A data stream is initialized with the index predicate; and the tuple is returned in the data stream. The apparatus comprises means for performing the above method steps, and the article of manufacture comprises a medium tangibly embodying computer instructions for performing these method steps.

20 Claims, 7 Drawing Sheets

METHOD AND APPARATUS FOR EVALUATING INDEX PREDICATES ON COMPLEX DATA TYPES USING VIRTUAL INDEXED STREAMS

BACKGROUND OF THE INVENTION

1. Field of the Invention

The present invention relates to systems and methods for performing queries on data stored in a database, and in particular to a method and system for providing access to an array-based data object to a client.

2. Description of the Related Art

Large-scale integrated database management systems provide an efficient, consistent, and secure means for storing and retrieving vast amounts of data. This ability to manage massive amounts of information has become a virtual necessity in business today.

At the same time, wider varieties of data are available for storage and retrieval. In particular, multimedia applications are being introduced and deployed for a wide range of business and entertainment purposes, including multimedia storage, retrieval, and content analysis. Properly managed, multimedia information technology can be used to solve a wide variety of business problems. In some cases, the data objects to be stored, retrieved, and manipulated are quite large. Such data objects include, for example binary large objects (BLOBs), character large objects (CLOBs), video, audio, images, and text.

By virtue of their sheer size, these large data objects can be difficult to manage. Object relational database systems, for example, store information as a collection of tables. Each table is a set of tuples, and each tuple is an ordered list of attributes. Each of these attributes has a type. An object-relational database system allows these types to include complex types such as text, video, images, and spatial data. To perform rapid searches, it is useful to build an index for these complex data types. For example, to answer a query that retrieves all documents that have the words "fool" and "gold" in it, it would be very useful to have a text index built on the text documents. Such an index would allow the search to be answered efficiently, without requiring that each text document of the database be retrieved.

A traditional index in a database system accepts a value as an argument and returns a list of tuple identifiers. However, tuple identifiers are insufficient to allow use of a database index with complex data types. From the foregoing, it is apparent that there is a need for a system that will allow for efficient indexing and retrieval of complex data types from an object-relational database. The present invention satisfies that need.

SUMMARY OF THE INVENTION

To address the requirements described above, the present invention discloses a method, apparatus, and an article of manufacture for providing access to abstract data types (ADTs) using an index providing a tuple.

The method comprises the steps of accepting a database query; generating an index predicate from the database query; and determining a tuple from an index using the index predicate. The tuple is associated with an abstract or complex data type responsive to the database query. A data stream is initialized with the index predicate; and the tuple is returned in the data stream. The apparatus comprises means for performing the above method steps, and the article of manufacture comprises a medium tangibly embodying computer instructions for performing these method steps.

With complex data types such as text, the index of the present invention accepts a value as an argument and returns a set of tuples, not just the tuple identifiers that are used with simple data types. Each of such tuples includes a list of values that must be conveyed in order to provide the information from the index to respond to the query. The presentation of the tuple sets, rather than merely tuple IDs presents a difficult problem. The present invention solves this problem with the use of a virtual index data stream. The database engine initializes the stream with the index predicate (i.e. find documents with the words "fool" and "gold"). The stream then starts returning back a tuple for each of the complex data types having data responsive to the query. The individual values in the tuples can be viewed as ordinary tuples that are stored on disk as tables or relations. In one embodiment, the database engine manipulates and processes the sets of tuples obtained from the virtual index stream, thus allowing the index to appear like a relation to the remainder of the database engine. This feature is useful for extensibility, since it allows new index modules to be plugged in, while appearing like a relation to the rest of the database engine. dr

DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
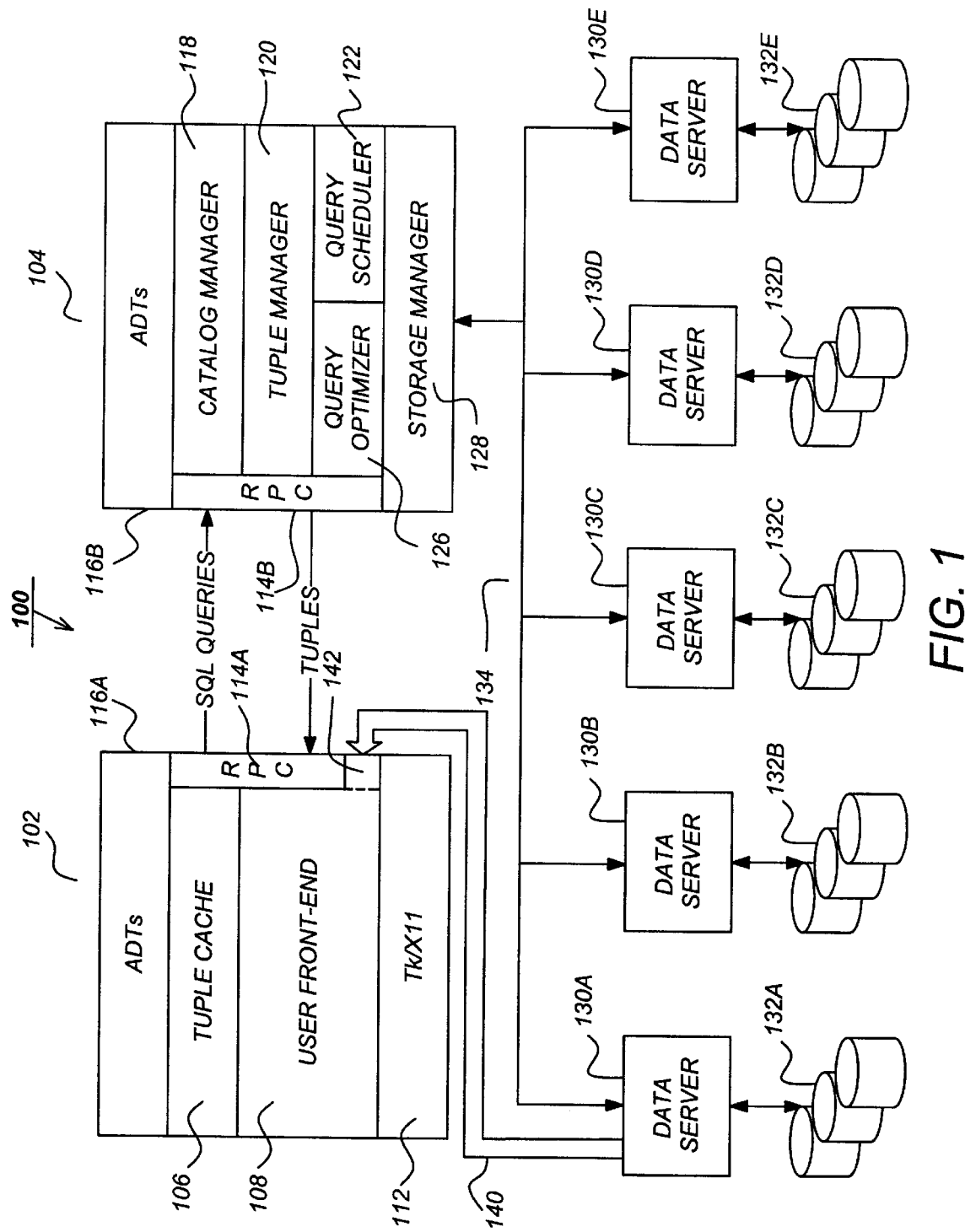
FIG. 1 is a block diagram showing an exemplary environment for practicing the present invention.

FIG. 1 is a diagram showing an exemplary environment in which the present invention may be practiced. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132). The data servers 130 also perform portions of the execution plan in execution threads as determined by the query coordinator 104 to execute the query. The query coordinator 104 and data servers 130 may be implemented in separate machines, or may be implemented as separate or related processes in a single machine. The QC 122 and the DS 130 communicate via a communication infrastructure 134 which can automatically select the most efficient mechanism for the transport of data between the QC 122 and any one of the DS 130 elements. When a message is between processes or entities that do not share a common memory system, a transport protocol such as transmission control protocol (TCP) or message passing interface (MPI) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 122 for submitting a query. After parsing and optimization, the QC 122 generates an execution plan for the query and transmits portions of that plan to the appropriate data servers 130A–130E for execution. Hence, the QC 122 controls the parallel execution of the query on the DS 130 processes. Query results including result sets are collected by the QC 122 for delivery back to the client process 102.

The QC 122 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, select, . . .) takes its input from an input stream and places its result tuples on an output stream. The streams themselves are C++ objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same or different processors, network streams also provide a flowcontrol mechanism that is used to regulate the execution rates of the different operators in the pipeline. Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 122), which is used to control the parallel execution of the query, instantiates the correct type of stream objects to connect the operators.

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase, each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase function with the definition of each aggregate.

The query coordinator 104 also comprises a tuple manager 120, a catalog manager 118, a query optimizer 126, a query scheduler 122, and a storage manager 128. The tuple manager receives the tuples from the data servers 130, formats and processes the tuples, and passes them along to the client program. The catalog manager 118 manages metadata regarding the tables and types in the database. The query optimizer generates an execution plan for queries received from the client process 102.

The client program 102 comprises a front end 108, which provides a graphical user interface that supports querying, browsing, and updating of database objects through either its graphical or textual user interfaces. In either case, the front end transforms a query into an extended SQL syntax and transmits it to the data server 130 for execution. After executing the query, the query coordinator 104 transmits the results back to the client program 102 in the form of a set of tuples, which can be iterated over using a cursor mechanism. In one embodiment, all communications between the front end 108 and the processes implemented in the query coordinator 104 are in the form of remote procedure calls (RPCs) 114A and 114B implemented over a Transmission Control Protocol/Interner Protocol (TCP/IP). The client process 102 also comprises a tuple cache 106 for retaining tuples received from the query coordinator 104. ADTs 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population>300K) in one layer on top of a second layer of country objects.

The client front end 108 also allows the user to query through a graphical interface; implicitly issuing spatial queries by zooming, clicking, or sketching a rubber-banded box on the 2-D map. The graphical capabilities of the client can be implemented using toolkits such as Tk/X11. Further, the user can query by explicitly composing ad-hoc queries in the database system's 100 extended SQL syntax.

The user can use the client front end 108 to browse the objects from a table. In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. This data is received by the direct data transfer module 142 in the client 102.

Figure 2:
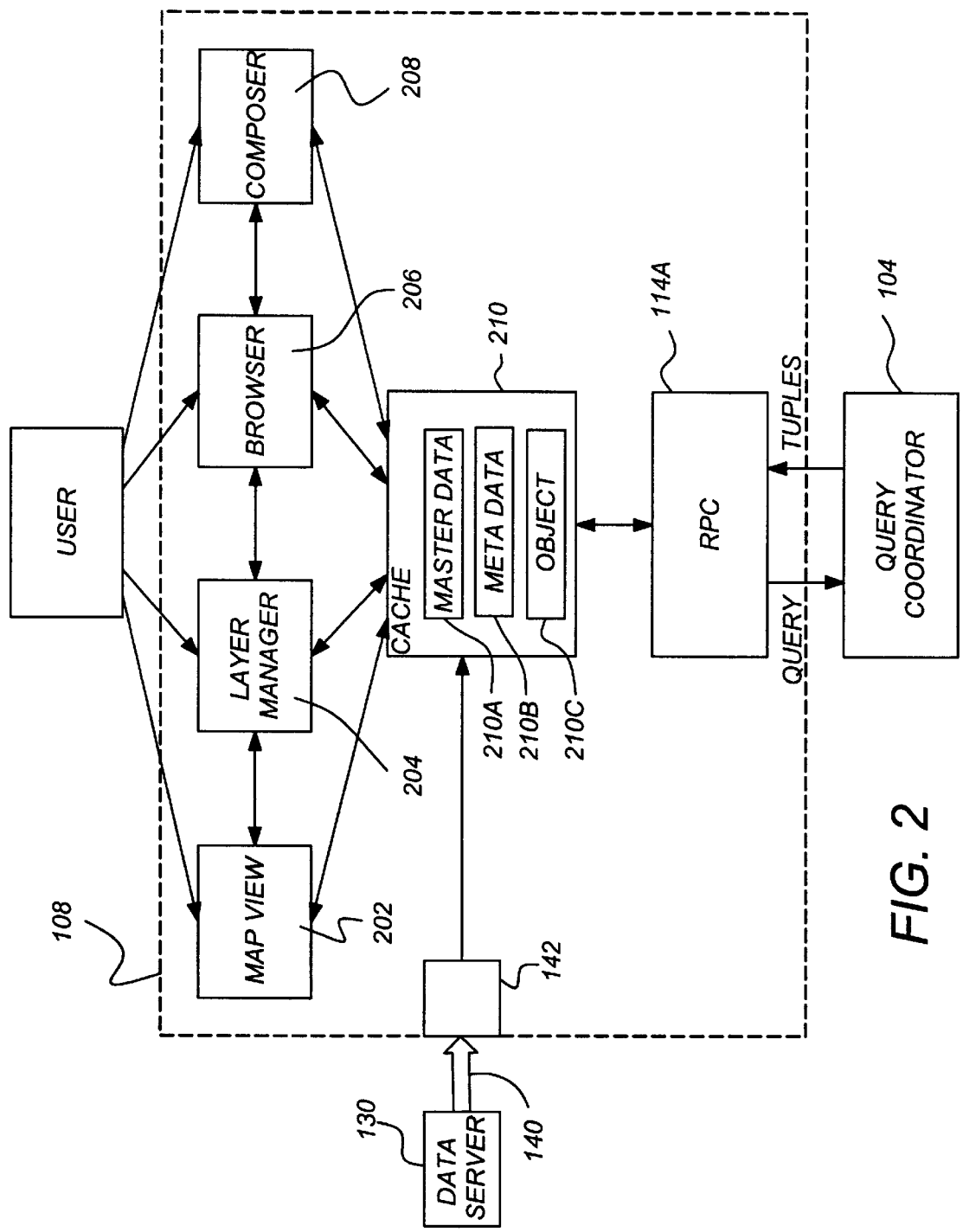
FIG. 2 is a diagram showing one embodiment of the user front end of the exemplary hardware environment depicted in FIG. 1.

FIG. 2 is a diagram showing one embodiment of the user front end of the exemplary environment depicted in FIG. 1. The client front end 108 comprises a map view 202, layer manager 204, browser 206 and a query composer 208. The map view 202 is responsible for displaying and manipulating objects contained in one or more layers. The current position of the cursor is continuously displayed in a sub-window in units of the map projection system. Users can point and click on displayed objects to view their non-spatial attributes. The layer manager 204 is responsible for adding, deleting, hiding, and reordering layers displayed by the map view 202. Each layer corresponds to a table of objects produced by executing some query. The extent browser 206 allows a user to view any database table and adjust the way it should be displayed by the map view 202. The selected table becomes a new layer with its spatial attributes displayable via the map view 202.

The query composer 208 allows a user to compose a SQL query using a simple text editor. The RPC 114 is the interface to the query coordinator 104. It ships SQL queries to the query coordinator 104 for execution and retrieves result tuples into the cache 210. The cache 210 comprises a master data cache 210A, a metadata cache 210B and an object cache 210C. The object cache 210C caches the result of a query in formats understood by the map view 202. The metadata cache 210B stores the catalog information of the currently open database. The master data cache 210A stores retrieved master data as described further below. In one embodiment, the object cache 210C also caches the objects downloaded from the data servers 130. FIG. 2 also shows the second communication path 140 from the data server 130 to the user front end 108 via the direct data transfer module 142.

Array-based abstract data types can be used as basis for a number of useful data types, including BLOBs, CLOBs, video, audio, text, image, maps and other large objects. Array-based ADT use an external out-of-line storage for very large objects.

Figure 3:
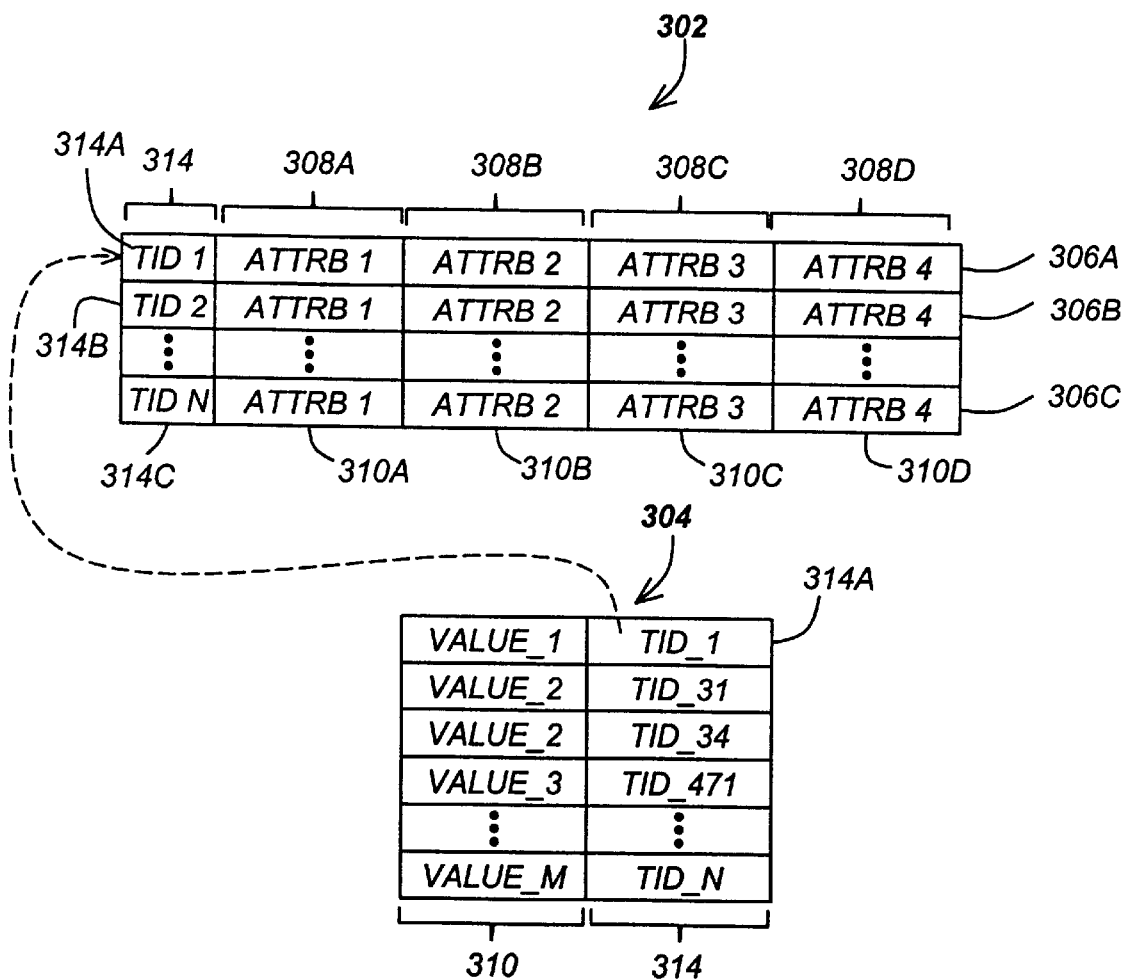
FIG. 3 is a diagram illustrating a relationship between a database table having non-ADT data and an index for the database table.

FIG. 3 is a diagram illustrating a relationship between a database table 302 having non-ADT data and an index 304 for the database table 302. The database table 302 includes rows of tuples 306A–306C (collectively referred to hereinafter as tuple(s) 306). The tuples 306 are organized by attributes 308A–308D (collectively referred to hereinafter as attribute(s) 308) arranged by columns. Each tuple 306 has one or more attribute values. For example, tuple 306C is characterized by attribute values 310A–310D. Each row or tuple 306 of the database table is uniquely identified by a table tuple ID 314–314C The index 304 includes attribute values 310 and tuple IDs 314. The index 304 associates (i.e. by logical proximity) the attribute values 310 with the tuples 306A–306C via the tuple IDs 314. In the illustrated example, the index 304 indicates that $VALUE_{13}$ 1 314A is one of the attributes in the tuple identified by $TID_{13}$ 1 314A.

Figure 4:
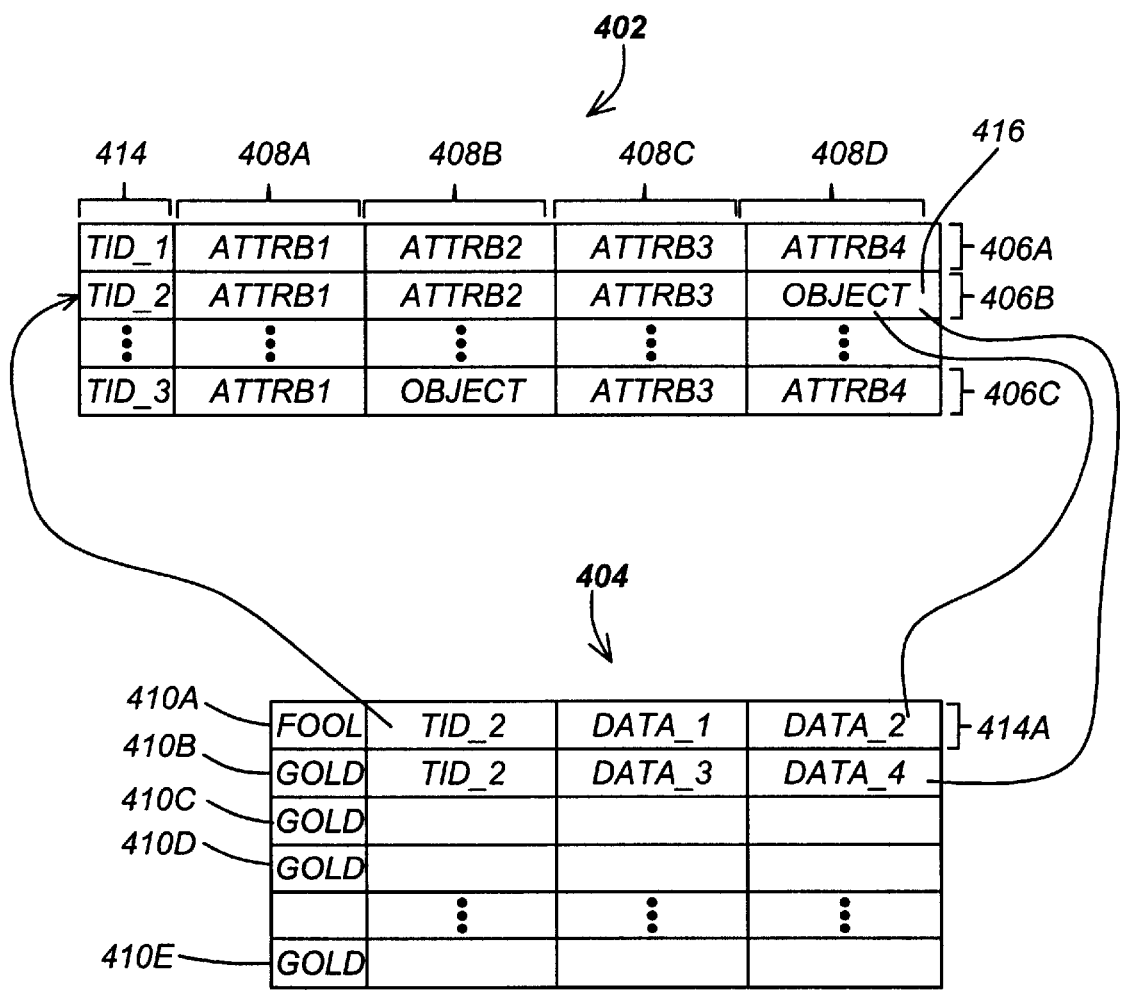
FIG. 4 is a diagram illustrating a relationship between a database table including complex data types such as objects and an index for the database table.

FIG. 4 is a diagram of illustrating a relationship between a database table 402 including complex data types such as objects and an index 404 for the database table 402. Here, the index accepts a value as an argument and returns a set of tuples, including, for example tuple 414A, instead of a list of tuple IDs as was the case for the non-ADT data types shown in FIG. 3.

The tuple 414A shown in the index table 404 illustrated in FIG. 4 indicates that the text "FOOL" is included in one of the tuples identified by tuple ID (TID) 2.

The $DATA_{13}$ 1 and $DATA_{13}$ 2 elements in the tuple 414A provide additional information regarding the object 416 or attributes 406 in the tuple. For example, tuple 414A element $DATA_{13}$ 2 indicates where, within the text object 416, the value "FOOL" can be found. This can be accomplished, for example, with a pointer stored as a tuple 414 element. Similarly, tuple element $TID_{13}$ 2 indicates that the text "GOLD" can be found in the database 402 tuple identified by $TID_{13}$ 2, and $DATA_{13}$ 4 indicates where the "GOLD" text may be found in object 416.

Figure 5:
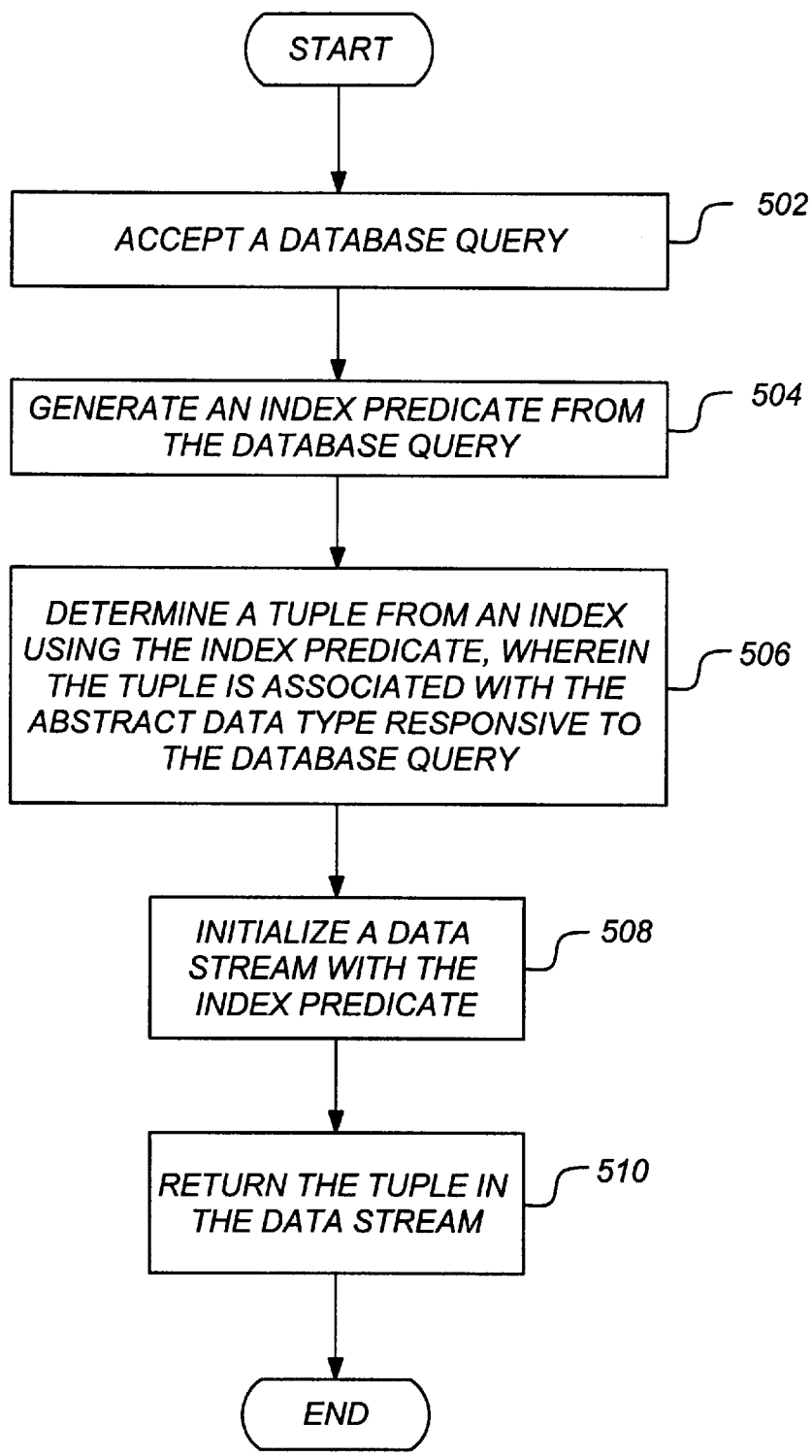
FIG. 5 is a flow chart illustrating exemplary process steps used to practice one embodiment of the present invention.

FIG. 5 is a flow chart illustrating exemplary process steps used to practice one embodiment of the present invention. A database query is accepted by the database system 100, as shown in block 502. An index predicate is then generated from the database query, as shown in block 504. A tuple 414 is determined from the index 404 using the index predicate, wherein the tuple 414 is associated with an abstract data type such as the object 416 that is responsive to the database query. A data stream is initialized with the index predicate, and the tuple is returned in the data stream, as shown in blocks 508 and 510.

Figure 6:
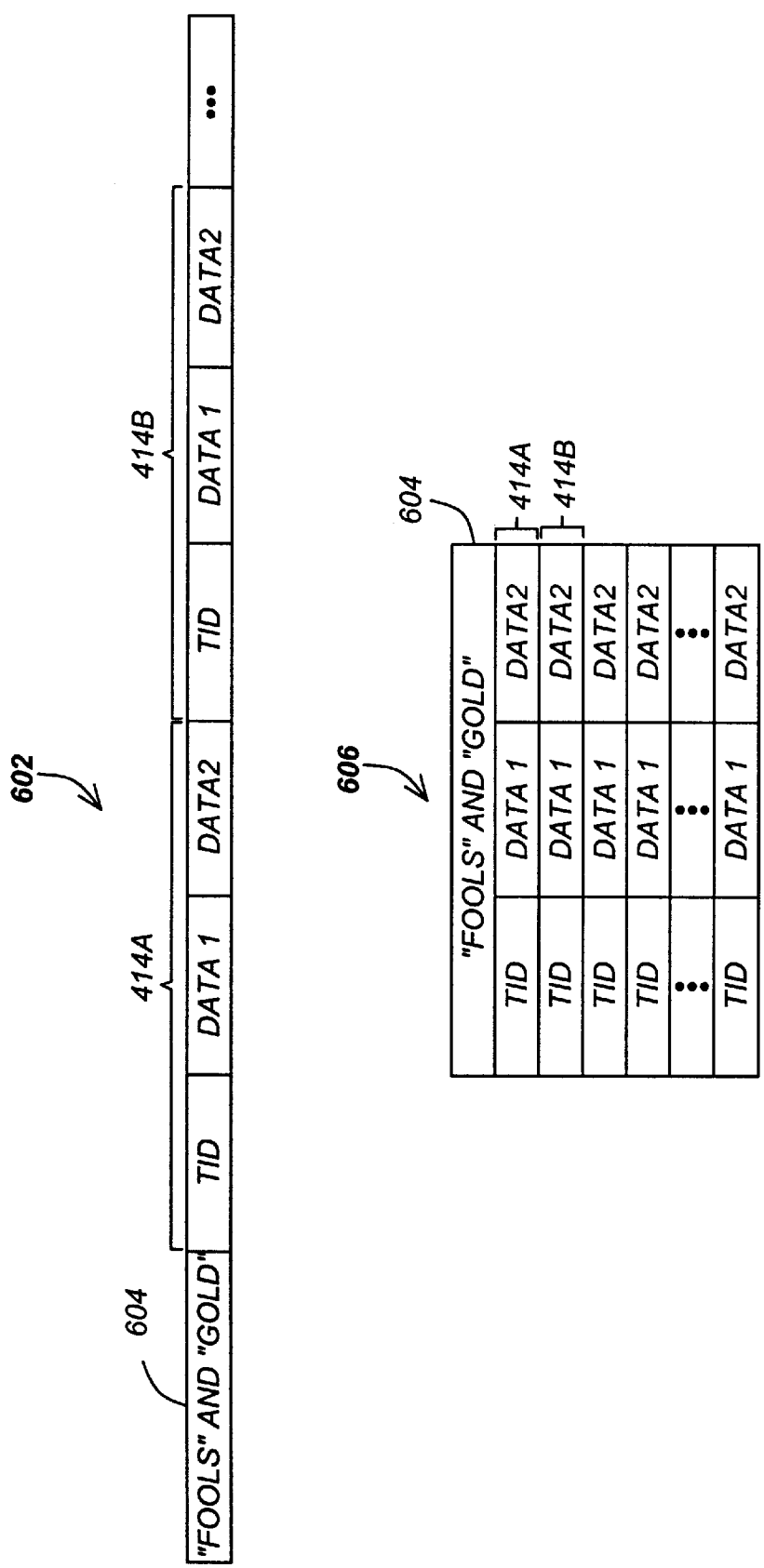
FIG. 6 is a diagram showing a data stream created by the process steps shown in FIG. 5.

FIG. 6 is a diagram showing the data stream 602 created by the above method steps, including the index predicate 604, and tuples 414A and 414B. The data stream 602 may be represented as a relation such as a table 606 having the tuples 414A, 414B and the index predicate 604.

Figure 7:
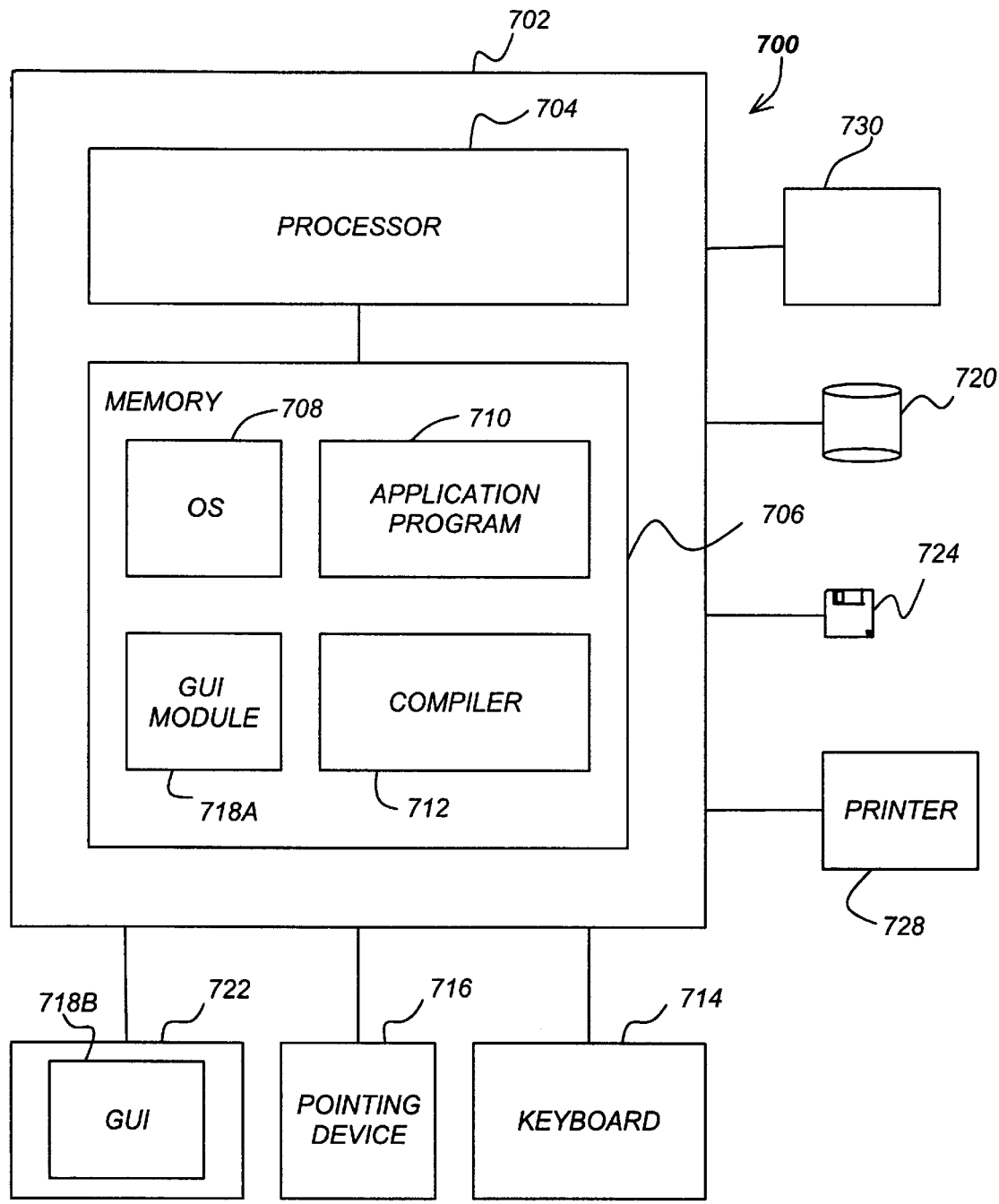
FIG. 7 illustrates an exemplary computer system that could be used to implement elements of the present invention.

FIG. 7 illustrates an exemplary computer system 700 that could be used to implement the present invention. The computer system 700 can perform the client processes 102, the functions of the query coordinator 104, or the data servers 130.

In the illustrated embodiment, the computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI)

module 718A. Although the GUI module 718A is depicted as a separate module, the instructions performing the GUI functions can be resident or distributed in the operating system 708, the computer program 710, or implemented with special purpose memory and processors. The computer 702 may also implement a compiler 712 which allows an application program 710 written in a programming language such as COBOL, C++, FORTRAN, JAVA, or other language to be translated into processor 704 readable code. After completion, the computer program 710 accesses and manipulates data stored in the memory 706 of the computer 702 or in remote storage devices using the relationships and logic that was generated using the compiler 712. The computer 702 also optionally comprises an external communication device 730 such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the steps necessary to implement and/or use the present invention. Computer program 510 and/or operating instructions may also be tangibly embodied in the memory 506 and/or remote or local data communications devices 730, thereby making a computer program product or article of manufacture according to the invention. The present invention may be implemented as a method, apparatus, or article of manufacture using standard programming and/or engineering techniques to produce software, firmware, hardware, or any combination thereof. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. In summary, the present invention describes a method, apparatus, and article of manufacture for providing access abstract data types using an index providing a tuple.

The method comprises the steps of accepting a database query; generating an index predicate from the database query; and determining a tuple from an index using the index predicate. The tuple is associated with an abstract or complex data type responsive to the database query. A data stream is initialized with the index predicate; and the tuple is returned in the data stream. The apparatus comprises means for performing the above method steps, and the article of manufacture comprises a medium tangibly embodying computer instructions for performing these method steps.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing access to data stored in a database, the data including at least one abstract data type indexed by a tuple, comprising the steps of:

accepting a database query;

generating an index predicate from the database query;

determining a tuple from an index using the index predicate, wherein the tuple is associated with an abstract data type responsive to the database query and includes descriptive information regarding the at least one abstract data type;

initializing a data stream with the index predicate; and returning the tuple in the data stream.

2. The method of claim 1, wherein the database includes at least one non-abstract data type, and the method further comprises the steps of:

determining tuple identifier for the non-abstract data type; and returning the tuple identifier in the data stream.

3. The method of claim 1, wherein the tuple provides an index to the abstract data type.

4. The method of clam 1, wherein the database comprises a plurality of abstract data types and:

the step of determining a tuple from a index using the index predicate comprises the step of determining a set of tuples from the index using the index predicate, wherein each tuple is associated with one of the abstract data types; and the step of determining the tuple in the data stream comprises the step of returning the set of tuples in the data stream.

5. The method of claim 1, father comprising the step of:

representing the data stream as a table.

6. An apparatus for providing access to data stored in a database, the data including at least one abstract data type indexed by a tuple, comprising:

means for accepting a database query;

means for generating an index predicate from the database query;

means for determining a tuple from an index using the index predicate, wherein the tuple is associated with an abstract data type responsive to the database query and includes descriptive information regarding the at least one abstract data type;

means for initializing a data stream with the index predicate; and means for returning the tuple in the data stream.

7. The apparatus of claim 6, wherein the database includes at least one non-abstract data type, and the method further comprises:

means for determining tuple identifier for the non-abstract data type; and means for returning the tuple identifier in the data stream.

8. The apparatus of claim 6, wherein the tuple provides an index to the abstract data type.

9. The apparatus of claim 6, wherein the database comprises a plurality of abstract data types and:
the means for determining a tuple from a index using the index predicate comprises means for determining a set of tuples form the index using the index predicate, wherein each tuple is associated with one of the abstract data types; and
the means for returning the tuple in the data stream comprises means for returning the set of tuples in the data stream.

10. The apparatus of claim 6, further comprising:
means for representing the data stream as a table.

11. A program storage device, readable by a computer, tangibly embodying at least one program of instructions executable by the computer to perform method steps of providing access to data stored in a database, the data including at least one abstract data type indexed by a tuple, the method steps comprising the steps of
accepting a database query;
generating an index predicate from the database query;
determining a tuple from an index using the index predicate, wherein the tuple is associated with an abstract data type responsive to the database query and includes descriptive information regarding the at least one abstract data type;
initializing a data stream with the index predicate; and
returning the tuple in the data stream.

12. The program storage device of claim 11, wherein the database includes at least one non-abstract data type, and the method steps further comprise the steps of:
determining a tuple identifier for the non-abstract data type; and
returning the tuple identifier in the data stream.

13. The program storage device of claim 11, wherein the tuple provides an index to the abstract dam type.

14. The program storage device of claim 11, wherein the database comprises a plurality of abstract data types and:
the method step of determining a tuple from a index using the index predicate comprises the method step of determining a set of tuples from the index using the index predicate, wherein each tuple is associated with one of the abstract data types; and
the method step of returning the tuple in the data stream comprises the method step of returning the set of tuples in the data stream.

15. The program storage device of claim 11, further comprising the method step of:
representing the data stream as a table.

16. An article of manufacture embodying logic for providing access to data stored in a database, the data including at least one abstract data type indexed by a tuple, the logic comprising:
accepting a database query;
generating an index predicate from the database query,
determining a tuple from an index using the index predicate, wherein the tuple is associated with an abstract data type responsive to the database query and includes descriptive information regarding the at least one abstract data type;
initializing a data stream with the index predicate; and
returning the tuple in the data stream.

17. The article of manufacture of claim 16, wherein the database includes at least one non-abstract data type, and the logic further comprises:
determining tuple identifier for the non-abstract data type; and
returning the tuple identifier in the data stream.

18. The article of manufacture of claim 16, wherein the tuple provides an index to the abstract data type.

19. The article of manufacture of claim 16, wherein the database comprises a plurality of abstract data types and wherein:
determining a tuple from a index using the index predicate comprises determining a set of tuples from the index using the index predicate, wherein each tuple is associated with one of the abstract data types; and
returning the tuple in the data stream comprises returning the set of tuples in the data stream.

20. The article of manufacture of claim 16, wherein the logic further comprises:
representing the data stream as a table.

* * * * *

UNITED STATES PATENT AND TRADEMARK OFFICE
CERTIFICATE OF CORRECTION

PATENT NO. : 6,678,686 B1
DATED : January 13, 2004
INVENTOR(S) : Kabra, N. and Patel, J.

It is certified that error appears in the above-identified patent and that said Letters Patent is hereby corrected as shown below:

Column 8,
Line 43, after "claim 1," delete "father" and insert -- futher --

Signed and Sealed this

Eleventh Day of January, 2005

JON W. DUDAS
*Director of the United States Patent and Trademark Office*